(12) United States Patent
Rez et al.

(10) Patent No.: US 10,344,763 B2
(45) Date of Patent: Jul. 9, 2019

(54) DISC TURBO CHARGER

(71) Applicants: Mustafa Rez, Covina, CA (US); Bassel Rez, Covina, CA (US)

(72) Inventors: Mustafa Rez, Covina, CA (US); Bassel Rez, Covina, CA (US)

( * ) Notice: Subject to any disclaimer, the term of this patent is extended or adjusted under 35 U.S.C. 154(b) by 0 days.

(21) Appl. No.: 15/819,897

(22) Filed: Nov. 21, 2017

(65) Prior Publication Data

US 2019/0063442 A1 Feb. 28, 2019

Related U.S. Application Data

(63) Continuation-in-part of application No. 15/688,521, filed on Aug. 28, 2017.

(51) Int. Cl.

| | | |
|---|---|---|
| *F04D 17/10* | (2006.01) | |
| *F04D 29/42* | (2006.01) | |
| *F04D 29/28* | (2006.01) | |
| *F02B 39/12* | (2006.01) | |
| *F04D 29/053* | (2006.01) | |
| *F02B 37/18* | (2006.01) | |
| *F04D 29/056* | (2006.01) | |
| *F02C 3/045* | (2006.01) | |
| *F02C 3/067* | (2006.01) | |
| *F02C 3/16* | (2006.01) | |
| *F02C 5/04* | (2006.01) | |
| *F02C 6/12* | (2006.01) | |
| *F01D 1/32* | (2006.01) | |
| *F02K 3/072* | (2006.01) | |

(Continued)

(52) U.S. Cl.
CPC ............ F04D 17/10 (2013.01); F02B 37/183 (2013.01); F02B 39/12 (2013.01); F02C 3/045 (2013.01); F02C 3/067 (2013.01); F02C 3/16 (2013.01); F02C 5/04 (2013.01); F02C 6/12 (2013.01); F04D 29/053 (2013.01); F04D 29/056 (2013.01); F04D 29/284 (2013.01); F04D 29/4206 (2013.01); *F01D 1/32* (2013.01); *F02C 7/08* (2013.01); *F02C 7/10* (2013.01); *F02K 3/072* (2013.01); *F05D 2240/40* (2013.01); *F05D 2260/606* (2013.01)

(58) Field of Classification Search
CPC ...... F02B 37/013; F02B 37/18; F02B 37/183; F02B 37/186; F02B 37/16; F02D 41/0007; F02C 3/067; F02C 3/073; F02C 3/045

See application file for complete search history.

(56) References Cited

U.S. PATENT DOCUMENTS

| | | |
|---|---|---|
| 762,175 A | 6/1904 | Lees |
| 1,186,950 A | 6/1916 | Seguin |

(Continued)

*Primary Examiner* — Craig Kim
*Assistant Examiner* — Katheryn A Malatek
(74) *Attorney, Agent, or Firm* — Kirk A. Buhler; Buhler & Associates

(57) ABSTRACT

A disc turbocharger includes a multi-disc engine in which each disc engine includes a turbine blade, a compressor blade, and a bearing without requiring a shaft between the turbine blade and the compressor blade. The power produced by each turbine blade is consumed by its own joined compressor. The disc turbocharger has a multi-disc engine that works as a multi-stage turbocharger with a smaller size and no piping between the turbochargers. The disc turbocharger uses a waste spool valve for control of the.

12 Claims, 12 Drawing Sheets

(51) Int. Cl.
*F02C 7/08* (2006.01)
*F02C 7/10* (2006.01)

(56) References Cited

U.S. PATENT DOCUMENTS

| | | | | |
|---|---|---|---|---|
| 2,238,061 | A | * | 4/1941 | Kendrick .............. F15B 11/055 |
| | | | | 417/357 |
| 2,428,330 | A | | 9/1947 | Heppner |
| 2,548,975 | A | * | 4/1951 | Hawthorne ............. F02C 3/073 |
| | | | | 415/79 |
| 3,005,311 | A | | 10/1960 | Ross |
| 3,363,419 | A | | 1/1968 | Wilde |
| 4,024,705 | A | | 5/1977 | Hendrick |
| 4,506,502 | A | * | 3/1985 | Shapiro ................... F02C 3/073 |
| | | | | 60/39.43 |
| 5,865,029 | A | * | 2/1999 | Brieschke ............. F15B 11/032 |
| | | | | 60/560 |
| 8,192,141 | B1 | | 6/2012 | Dale |
| 2006/0090450 | A1 | | 5/2006 | Moniz et al. |
| 2008/0093171 | A1 | * | 4/2008 | Portlock ................. F01D 5/022 |
| | | | | 184/6 |
| 2014/0075935 | A1 | * | 3/2014 | Kley ....................... F02B 41/10 |
| | | | | 60/605.1 |
| 2016/0208680 | A1 | * | 7/2016 | McConville .......... F02B 37/183 |
| 2016/0376981 | A1 | * | 12/2016 | Ullyott ................... F01C 11/008 |
| | | | | 60/607 |

* cited by examiner

DISC TURBO CHARGER

CROSS REFERENCE TO RELATED APPLICATION

This application is a continuation-in-part of applicant's co-pending application Ser. No. 15/688,521 filed Aug. 28, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a turbo charger. More particularly, the present disc turbo charger uses an inner turbine and an outer compressor placed in the same planar disc.

Description of Related Art Including Information Disclosed Under 37 CFR 1.97 and 1.98

Conventional turbochargers are driven by waste exhaust gasses which are forced through an exhaust turbine housing into a turbine wheel. The turbine wheel is connected by a common turbo shaft to a compressor wheel with a housing. The turbocharger at lower speed produces inadequate boost for proper engine transient response or turbo lag. To reduce the turbo lag, a two-stage variable twin-turbos employ a small turbocharger that operates at low speed and a large turbocharger for operation at higher speeds. The turbochargers are connected in series and require an intricate set of pipes to properly feed both turbo chargers.

To overcome these problems and provide a system that increases the efficiency and reduces the size of the two turbochargers with an intricate set of pipes, a disc turbocharger can be used which comprises multiple turbines in a single housing and multiple-compressors in a separate single housing without needing the intricate set of pipes and without needing a shaft and bearings between the turbine blade and the compressor blade.

Conventional turbo chargers also include a wastegate valve for control of the turbocharger, one type of this valve being a poppet valve where the valve comprises a valve head that cooperates with a valve seat. The valve seat head is connected to a valve stem that is mounted in a valve guide. A spring provides a bias valve to hold the valve in a closed position where the valve head is exposed to pressure of the exhaust gas upstream of the turbine itself so pressure from the exhaust gas acts on the poppet valve in a direction to open the valve when the pressure of the exhaust gas exceeds the pressure of the spring.

The valve opens and closes rapidly and a portion of the exhaust gas bypasses the turbine to limit a further increase of RPM of the turbine and compressor.

These problems with the turbo charger and waste spool valve are solved in this document where the valve opens and closes by spring and air pressure from the compressor and without intervention of the exhaust gas pressure.

BRIEF SUMMARY OF THE INVENTION

It is an object of the disc turbo charger to operate the turbine blade and the compressor blade without a shaft and bearing between the turbine blade and the compressor blade to make the assembly light weight.

It is an object of the disc turbo charger to operate the multi-disc engine in one housing, where one chamber is used to house the multi turbine blade and a second chamber is used to house the multi compressor blades without piping between the turbine and compressor blades.

It is an object of the disc turbo charger to be smaller in size and weight less when compared to twin turbos or three turbochargers.

It is an object of the disc turbo charger to reduce the turbo lag by using a one-disc engine at low speeds and a two-disc engine at higher engine speeds and exhaust flow.

It is another object of the disc turbo charger is to reduce the turbo lag by using an electrical motor with a one-way clutch that operates with a one-disc engine at low speeds of the combustion engine. At higher speeds of the combustion engine the electrical motor is not operated.

It is another object of the disc turbo charger to reduce the turbo lag by coupling the one-disc engine shaft with a one-way clutch to the combustion engine shaft at low speeds and to decouple the disc engine shaft from the combustion engine shaft by a one-way clutch at high speed. At low speeds the disc turbocharger works as a supercharger and at higher speeds the disc turbocharger operated as a turbocharger.

It is still another object of the disc turbo charger to use a waste spool valve to control the disc turbo charger instead of the wastegate valve.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
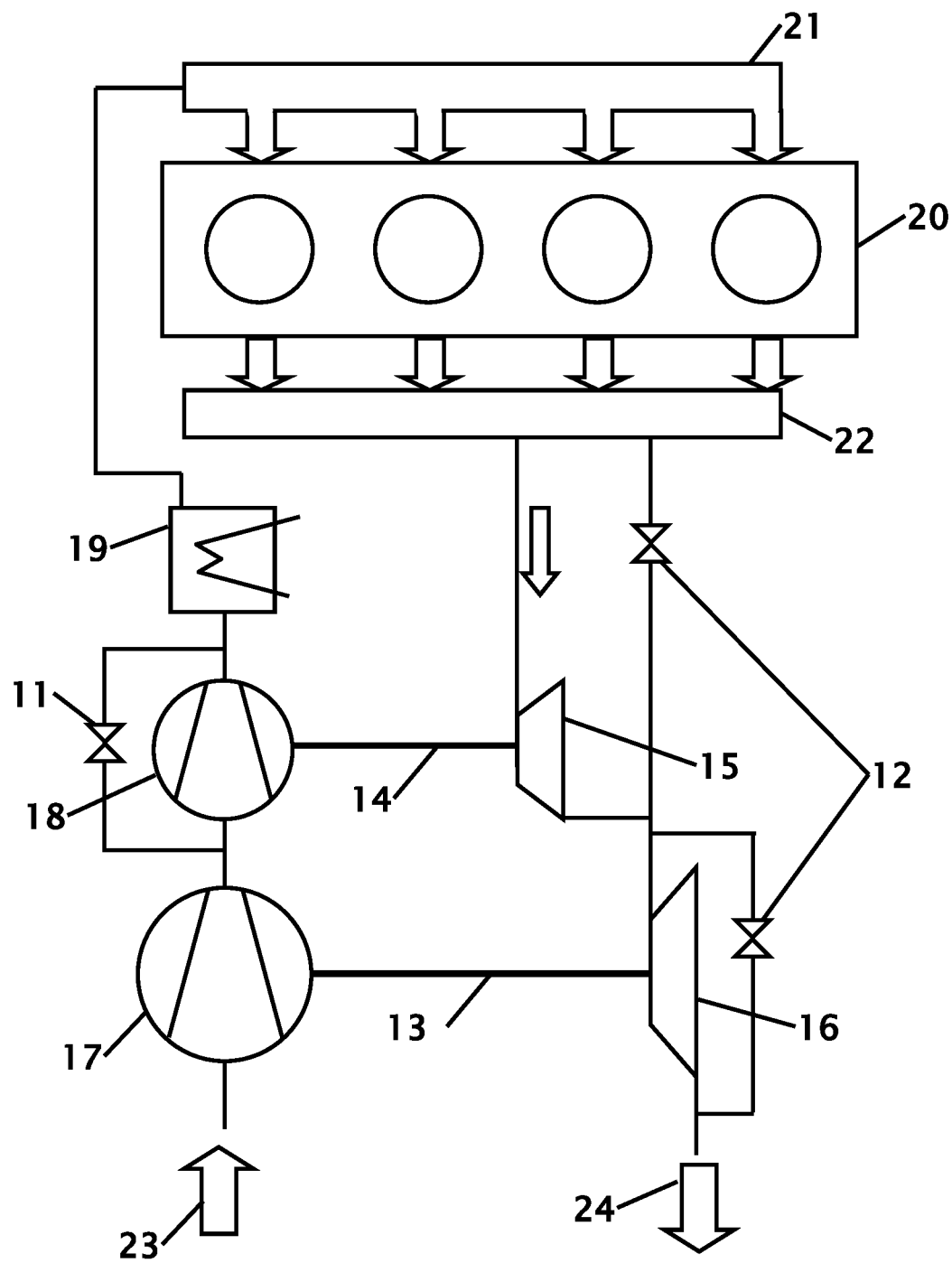
FIG. 1 shows a block diagram of a prior art two stage turbocharger.

FIG. 1 shows a block diagram of a prior art two stage turbocharger on an engine 20 with an intake manifold 21 and an exhaust manifold 22 where each turbocharger has a separate body with one body for the turbine 15, 16 and a second body 17, 18 for the compressor. The two bodies are connected with a shaft or shafts 13, 14. Piping connects the different stages with valve(s) 11 between the two turbochargers and there are one or two wastegate valves 12. This figure also shows an intercooler 19. Air is drawn into 23 the compressor 17 and exhaust 24 exits the last turbine 16.

Figure 2:
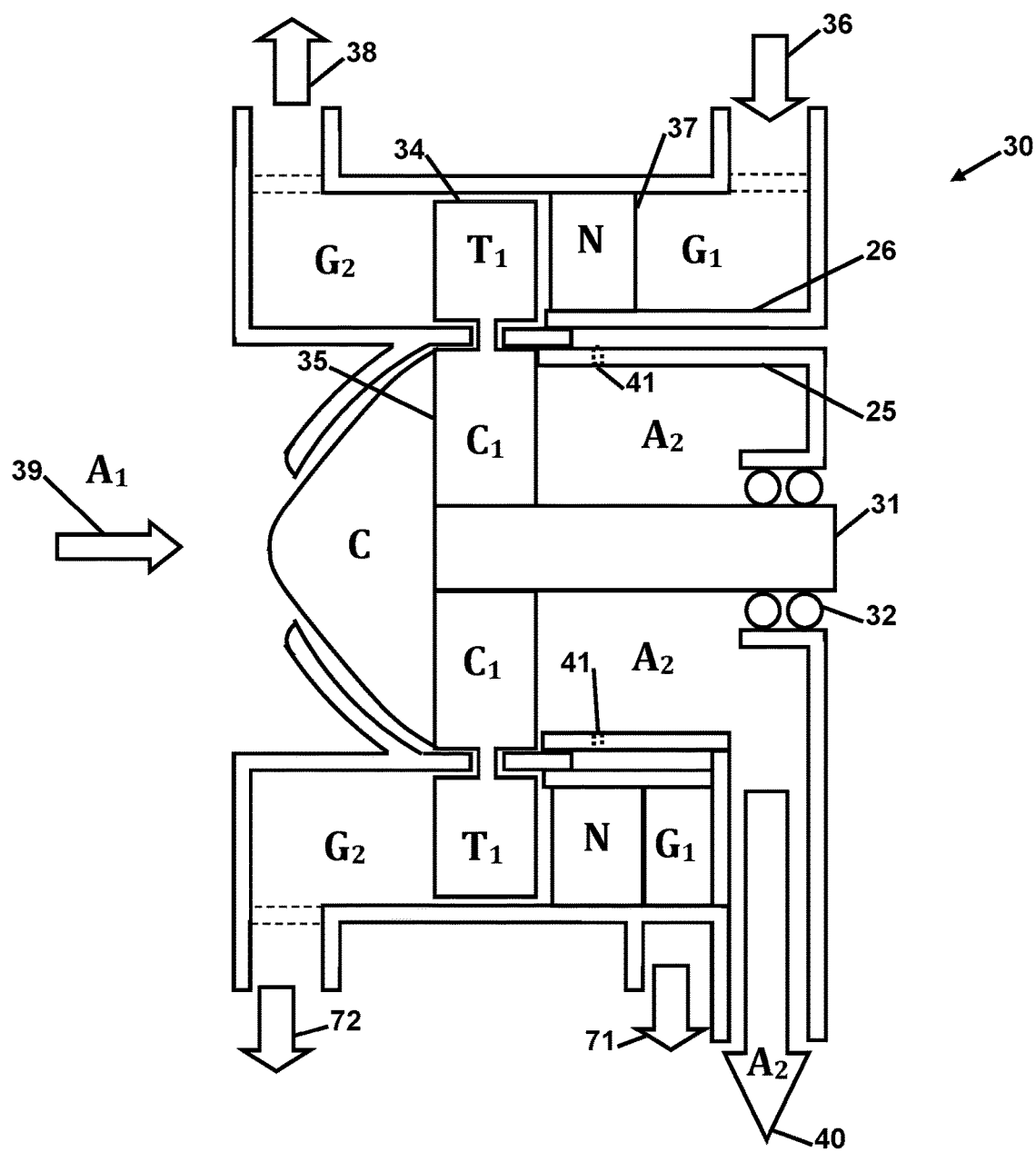
FIG. 2 shows a sectional view of a disc turbocharger.

FIG. 2 shows a sectional view of a disc turbocharger 30. The disc turbocharger 30 has a shaft 31 a bearing 32 a turbine blade 34 and a compressor blade 35. One or more of the compressor blade(s) 35 forms a compressor blade section. One or more of the turbine blade(s) 34 forms a turbine blade section blade section. The compressor blade 35 works as a centrifuge with axial flow. The exhaust gas 36 enters into the inlet chamber G1, then into the nozzle 37, then into the turbine blade 34 blade, then into outlet exhaust chamber G2 and then exits as exhaust gas 38. The outside filtered air 39 goes into inlet air chamber A1 where it is compressed with compressor blade(s) 35, then into outlet air compressed chamber A2 and then to outlet 40 to the engine. There is a spool exhaust valve that controls the system using inlet gas chamber G1, outlet exhaust chamber G2 and outlet air compressed chamber A2 as shown in FIG. 10. The disc turbocharger 30 includes a double wall with a compressor chamber wall 25 and a turbine chamber wall 26 between the compressor chamber and the turbine chamber. There are also air bleed vents 41 that intercools the compressor wall. The outlet port of chamber G1 goes into the spool valve through port 71. The outlet port of outlet exhaust chamber G2 goes to the spool valve through port 72.

Figure 3:
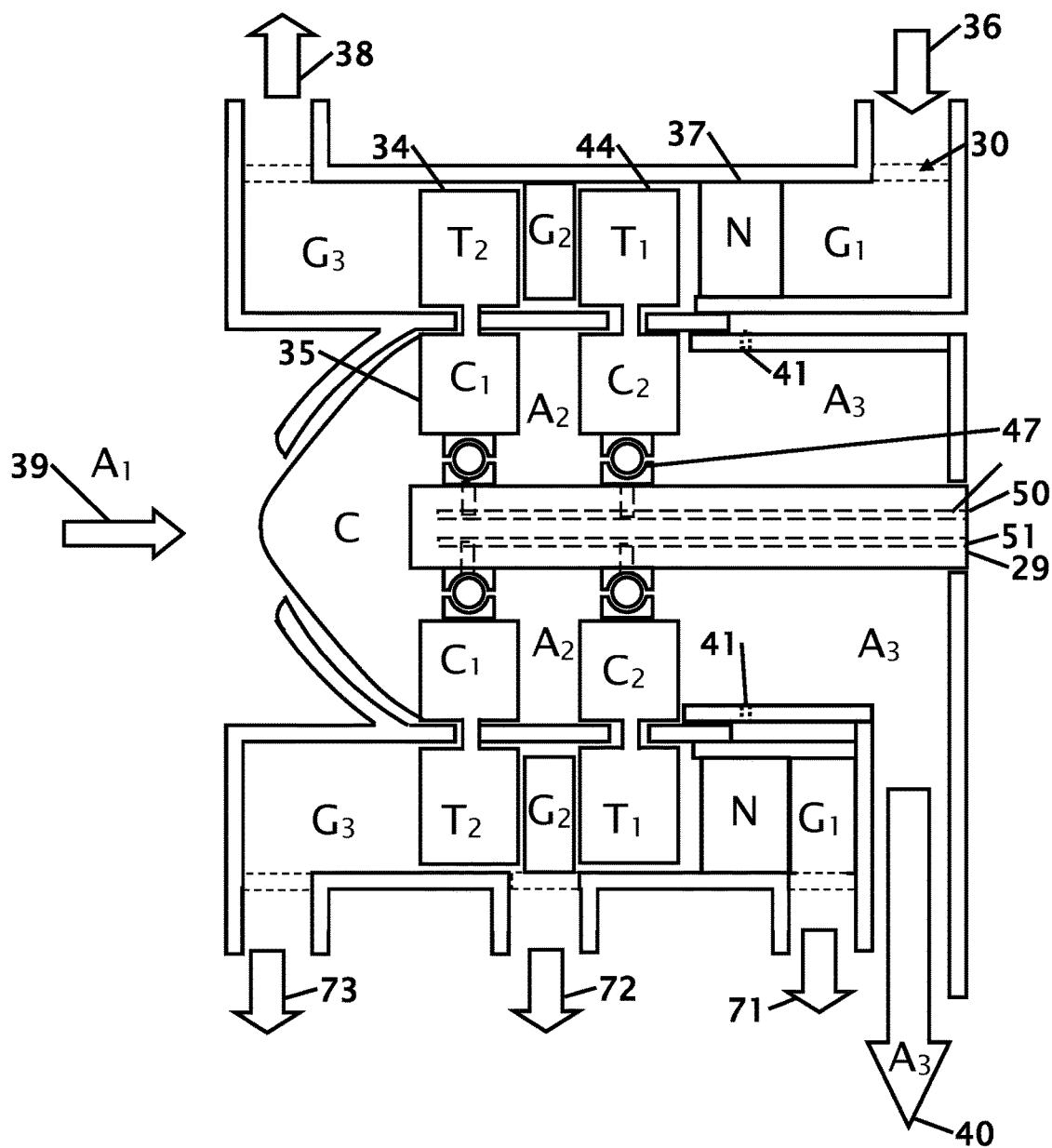
FIG. 3 shows a sectional view of the disc turbocharger with two discs operating as two turbochargers.

FIG. 3 shows a sectional view of the disc turbocharger with two-disc engines 34 and 44 operating as two turbochargers. A disc engine is a combination of a compressor blade 35, and a turbine blade 34 with or without a bearing 47 connecting the compressor 35 to the shaft 29 or 31. In this embodiment, each disc engine operates independently and in opposite directions of rotation or each other. Each disc is connected to a fixed shaft 29 with bearings 47. The fixed shaft 29 has two oil channels, one channel 50 is for oil to flow into the bearing(s) and one channel 51 is for oil that returns from the bearing(s). The disc turbocharger has a waste spool valve, shown in FIG. 11. To overcome turbo lag at low flow of the exhaust gas, only one disc 34 engine turns T2, and the exhaust gas will bypass T1 the second disc 44 through the port 72 at G2 to port 73 at G3 and through the waste spool valve as shown in FIG. 11. At high exhaust flow rates, the waste spool valve will close the port 72 at G2 and the exhaust gas will not be bypassed and the two-disc engines will work 34, 44. At higher exhaust flow rates, for safety of the combustion engine, the exhaust gas will partially bypass the two disc-engines 34, 44 as shown in FIG. 11.

Figure 4:
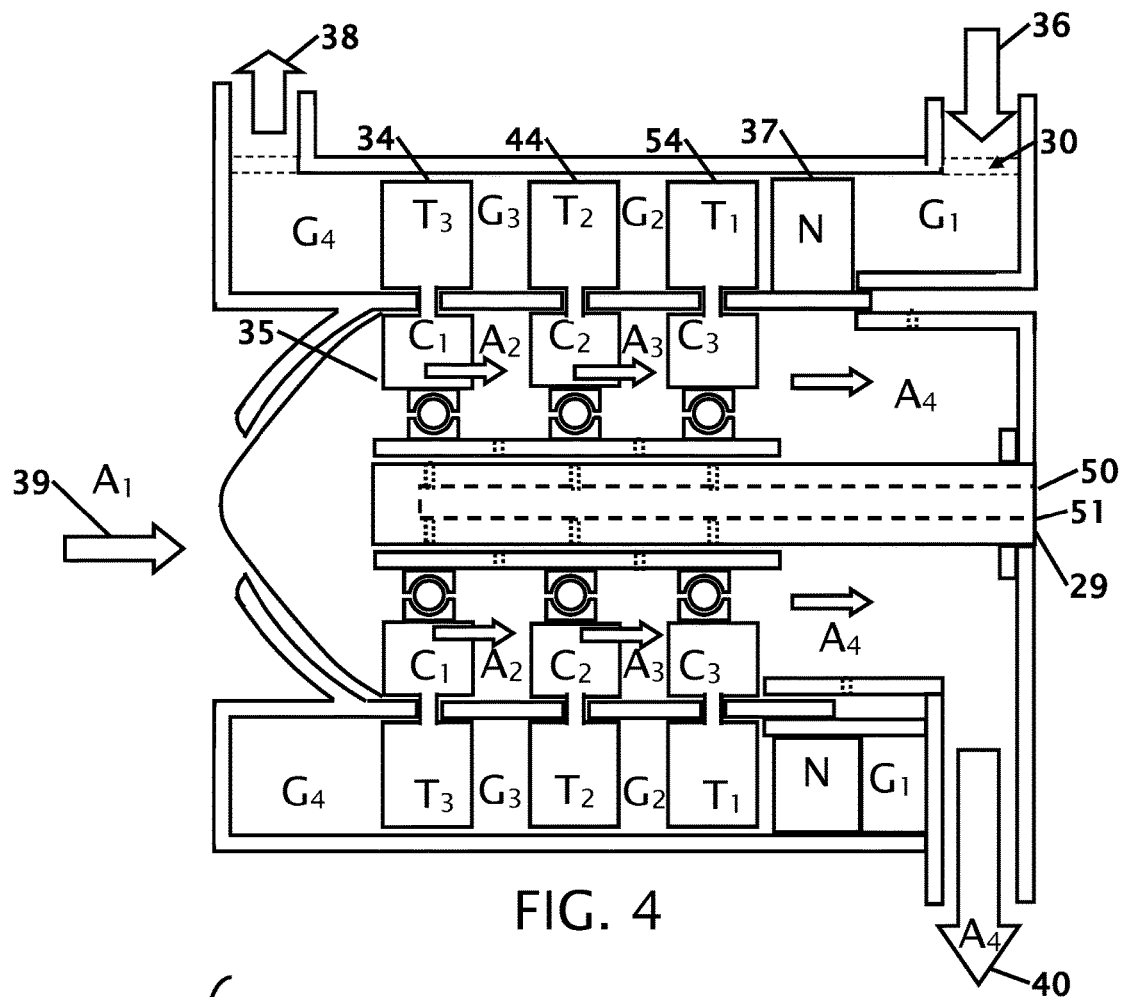
FIG. 4 shows a sectional view of the disc turbocharger with three discs.

FIG. 4 shows a sectional view of the disc turbocharger with three discs 34, 44 and 54. This embodiment is similar to the disc turbocharger shown and described in FIG. 3, and operates with higher exhaust vehicles such as diesel engines.

Figure 5:
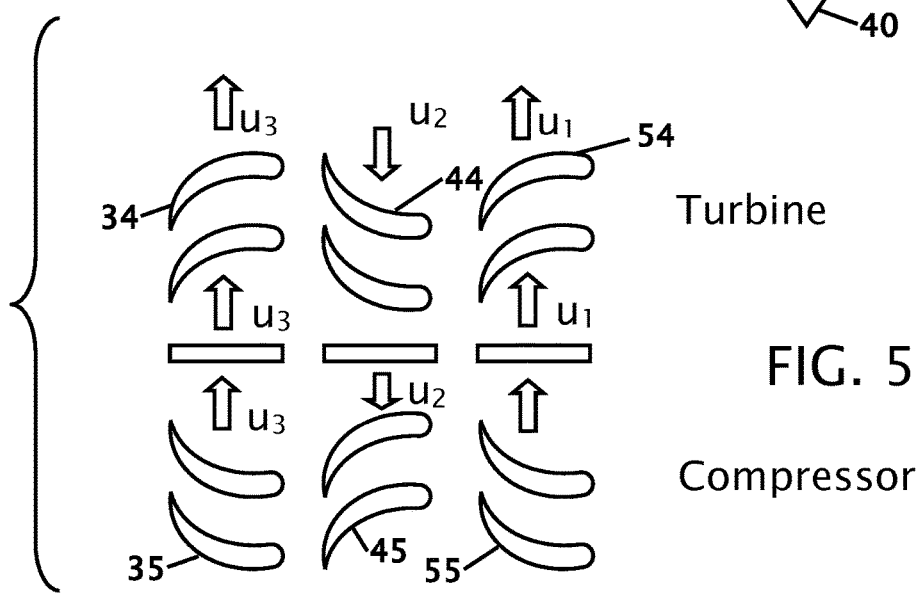
FIG. 5 shows a contemplated turbine blade and a compressor blade for a three-disc turbocharger.

FIG. 5 shows a contemplated turbine blades 34, 44 and 54 and a compressor blades 35, 45, and 55 for a three-disc turbocharger. The speed of each disc runs at a different speed to make the turbocharger more efficient. Flow u1, u2 and u3 show directional forces placed on the blades.

Figure 6:
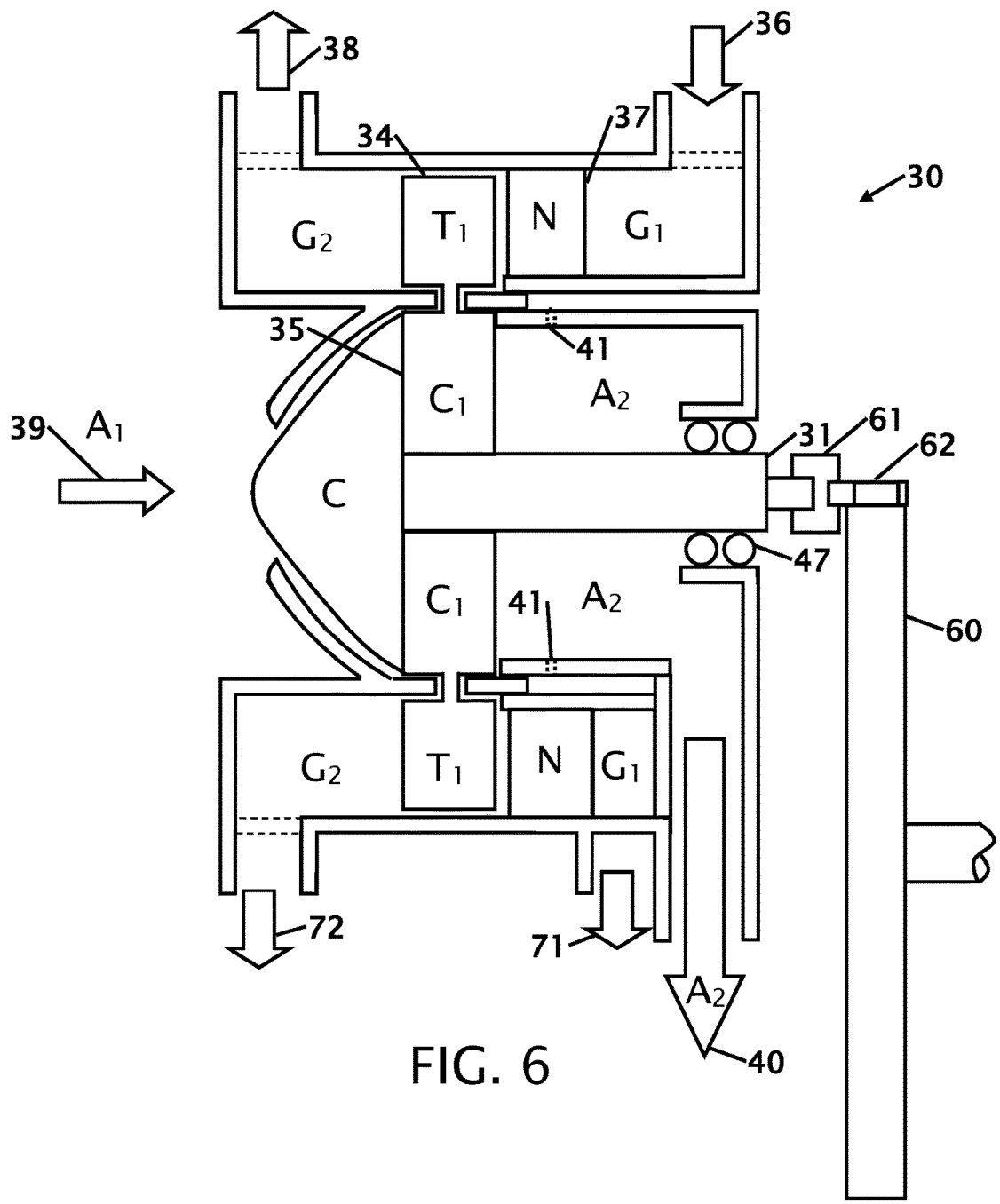
FIG. 6 shows a sectional view of the disc turbocharger as an alternate contemplated embodiment.

FIG. 6 shows a sectional view of the disc turbocharger as an alternate contemplated embodiment. This turbocharger has a one-disc engine with a shaft 31 that is coupled to a flywheel 60 with a one-way clutch 61 and a gear 62 or similar transmission. To overcome turbo lag at low exhaust flow rates, the flywheel and the disc turbo engine turn together as a supercharge and any extra torque is transferred from the turbine blade to the engine. At higher exhaust flow rates, the disc engine can run faster than the flywheel and the disc engine is decouple from the flywheel through a one-way clutch. In this mode, the disc turbocharger operates as a turbocharger.

Figure 7:
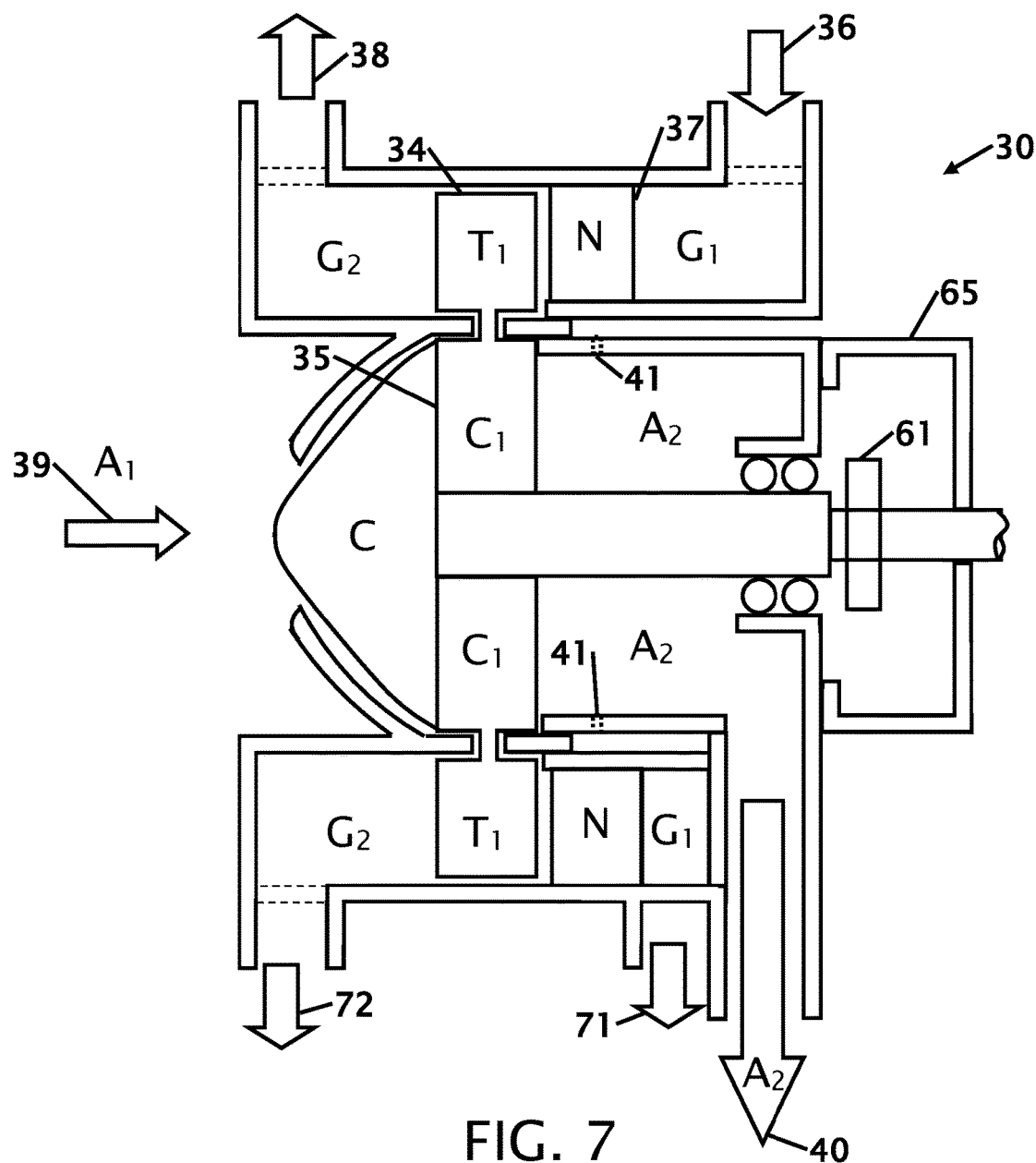
FIG. 7 shows a cross-section of another contemplated embodiment of the disc turbocharger.

FIG. 7 shows a cross-section of another contemplated embodiment of the disc turbocharger. This is a variation of the embodiment shown in FIG. 6. The disc is connected with one or more planetary gears 65 to the engine with a one-way clutch 61 or without a one-way clutch 61 as previously shown and described in FIG. 6. The gears 65 are a transmission, while gears are shown and disclosed, other forms of a transmission are contemplated, including but not limited to planetary gears, continuously variable transmission and a gear box.

Figure 8:
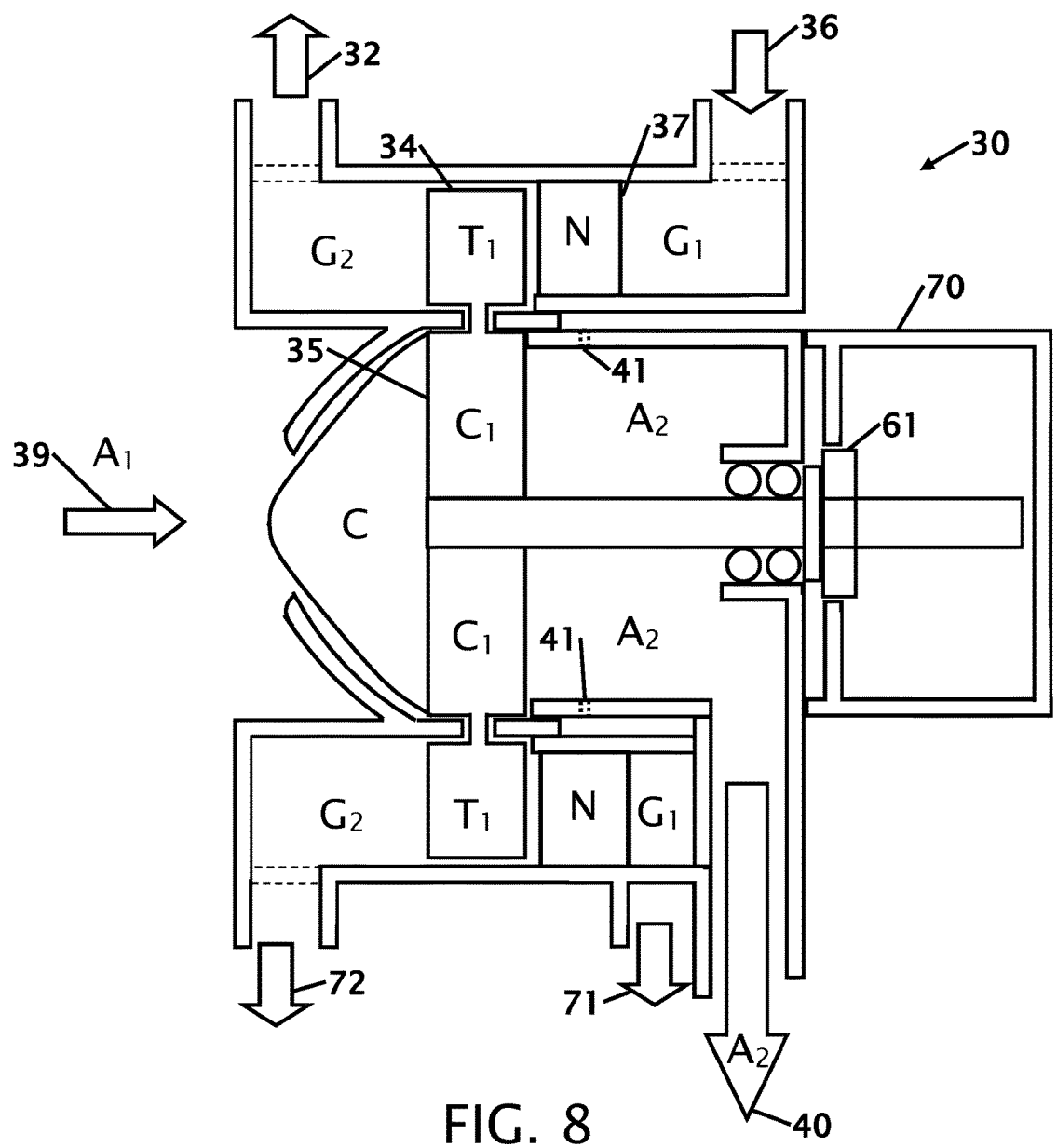
FIG. 8 shows a sectional view of the disc turbocharger in another contemplated embodiment.

FIG. 8 shows a sectional view of the disc turbocharger in another contemplated embodiment. This embodiment uses an electrical motor 70 for assisting the turbocharger at low exhaust flow rates. At higher exhaust flows the electric motor will be disconnected from the power supply by the engine controller and the electrical motor shaft is decoupled from the disc turbocharger shaft using a one-way clutch 61.

Figure 9:
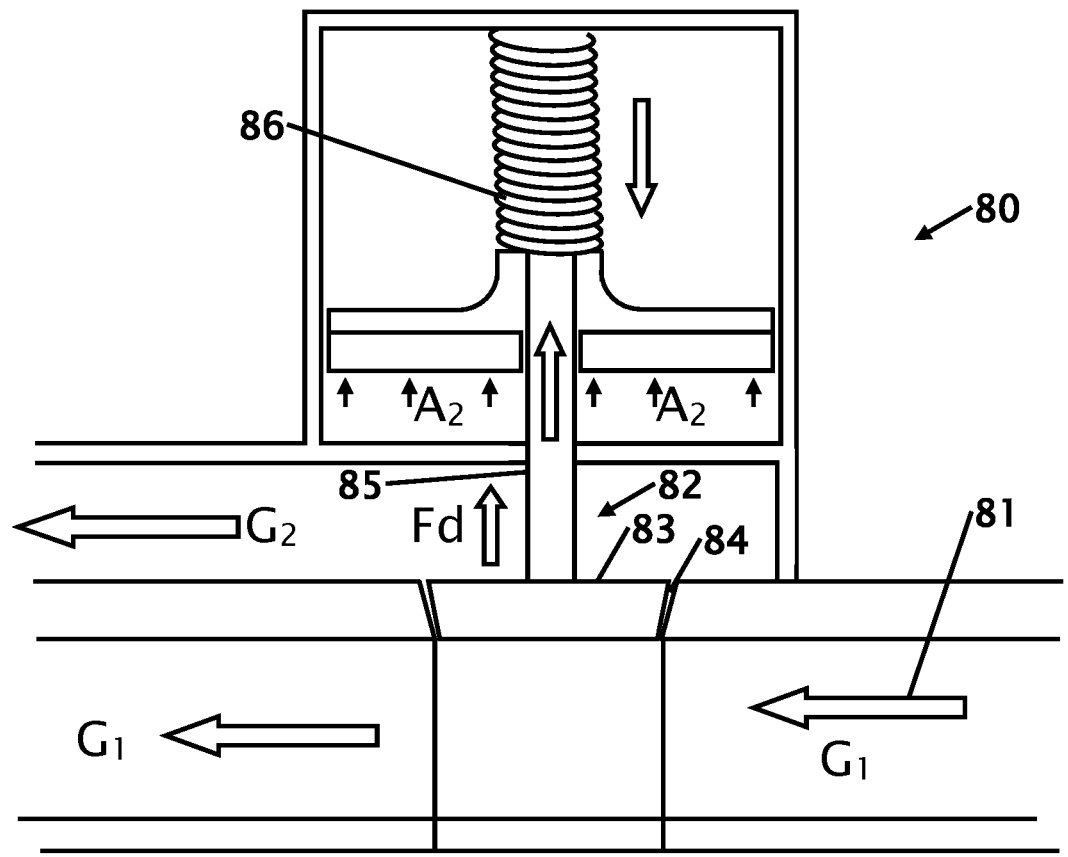
FIG. 9 shows a sectional view of a prior art wastegate valve.

FIG. 9 shows a sectional view of a prior art wastegate valve 80. The exhaust gas 81 will bypass the turbocharger by using the poppet valve 82, in which the valve comprises a valve head 83 in a valve seat 84, the valve head 83 is carried by a valve stem 85 that is mounted in a valve guide. A spring 86 is provided to bias the valve into a closed position. The valve head 83 is exposed to pressure of the exhaust gas 81 upstream of the turbine itself in such a way that pressure of the exhaust gas 81 acts on the poppet valve 82 in a direction to open the valve. When the pressure of the exhaust gas 81 overcomes the pressure of the spring 86, the valve opens and a portion of the exhaust gas 81 bypasses the turbine to further limit an increase of speed and pressure from the turbine and compressor.

A problem arises in poppet valves 82 as the exhaust 81 pressure pulsates. The peak value of the exhaust pressure pulses, either directly or when superimposed in the pressure of the supply of operating fluid, approximately balance the pressure of the spring 86, this causes the valve to open and close very rapidly and may continue throughout all open conditions of the valve. Valve oscillation in turn causes rapid wear.

Figure 10A:
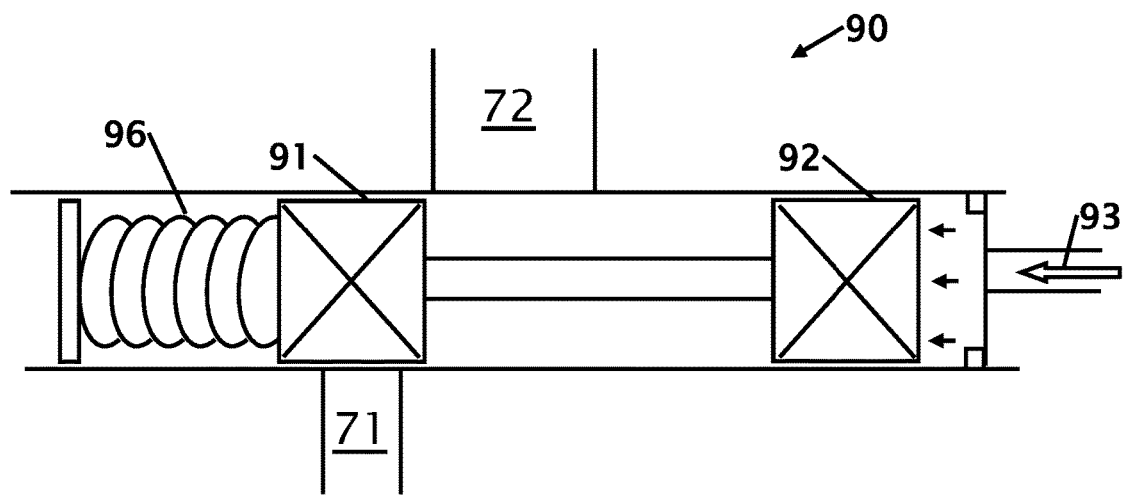
FIGS. 10A and 10B show sectional views of a wastegate spool valve at different stages of operation.
Figure 10B:
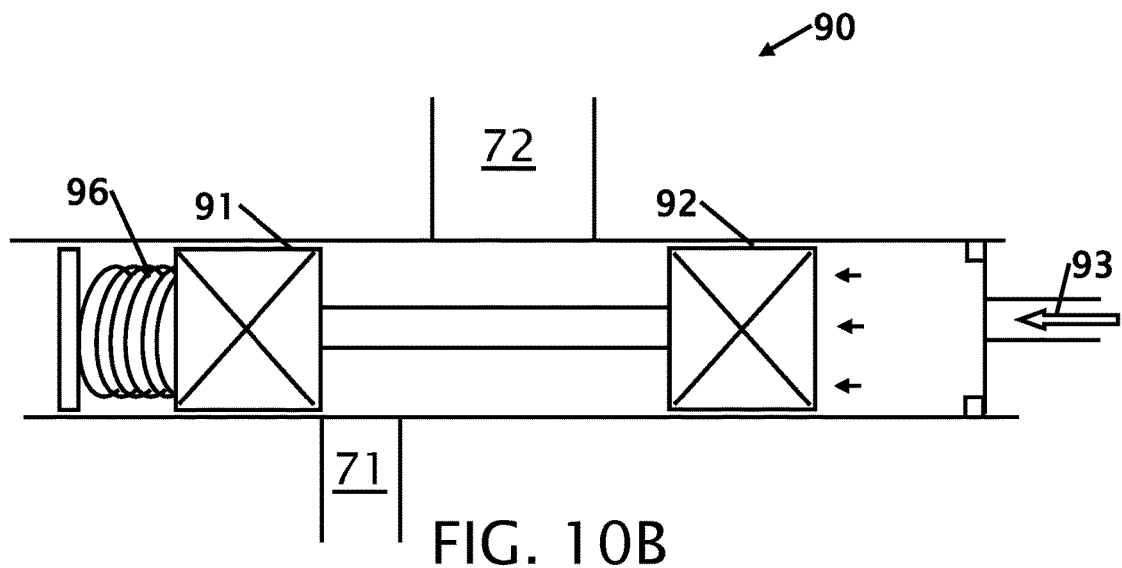

FIGS. 10A and 10B show sectional views of a waste spool valve 90 at different stages of operation. This style of exhaust gas valve operates independently of the exhaust gas pressure. The only two elements that control the valve are the spring 96 load and the high pressure of the air after the compressor 93. The spool valve includes a two-piston 91, 92 with a cartridge body using a thermal insulator with compression rings, the high pressure compressed air A2 will balance the spring 96 load. At low pressure there is no bypass to the exhaust gas for the system. The port 71 of exhaust gas before the turbine 34 is closed. At high pressure compressed air 93 pushes the piston 92 to open the port 71 before the turbine 34 to the port 72 after the turbine of turbocharger 34 for bypassing the exhaust gas. This waste spool valve bypasses one-or-more discs.

Figure 11A:
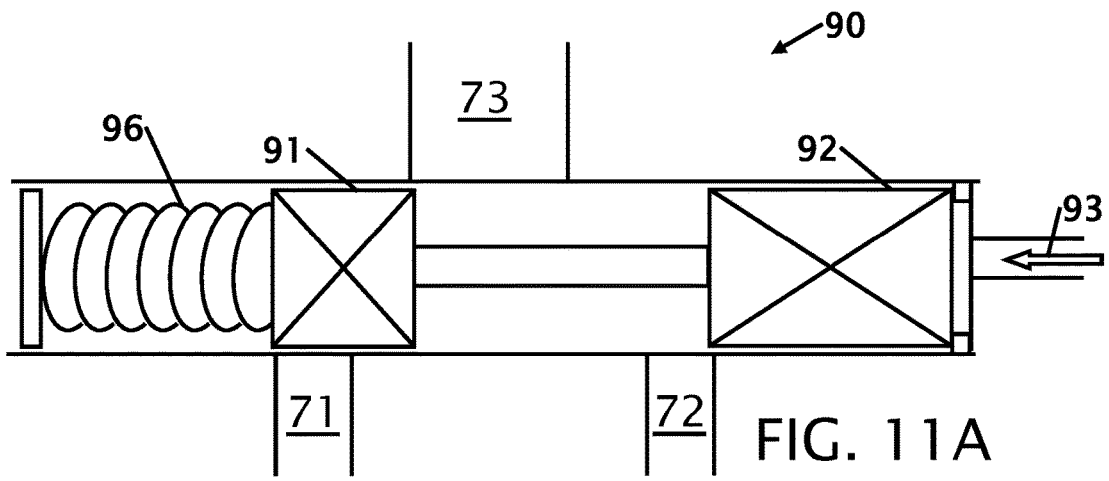
FIG. 11A-11C show sectional view of the waste spool exhaust valve in operation.
Figure 11B:
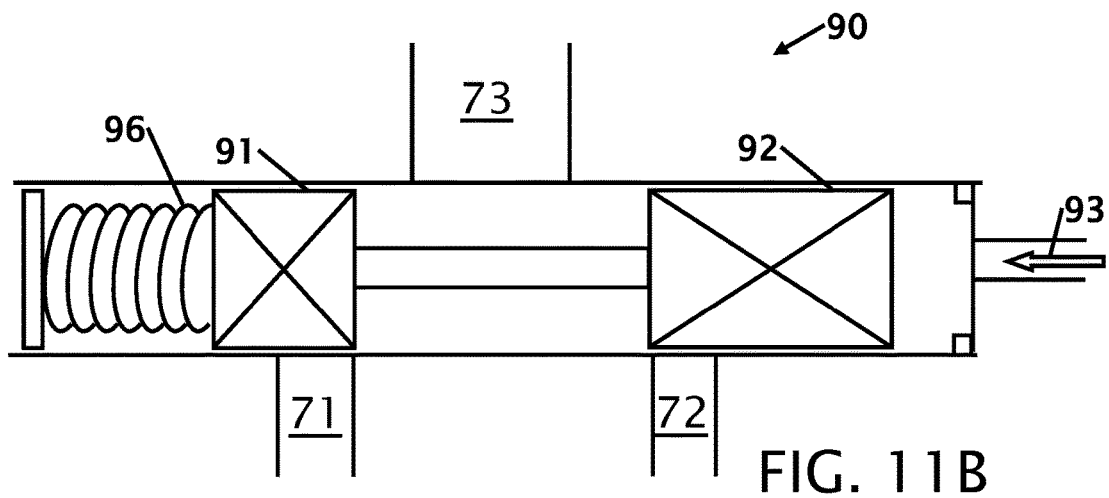
Figure 11C:
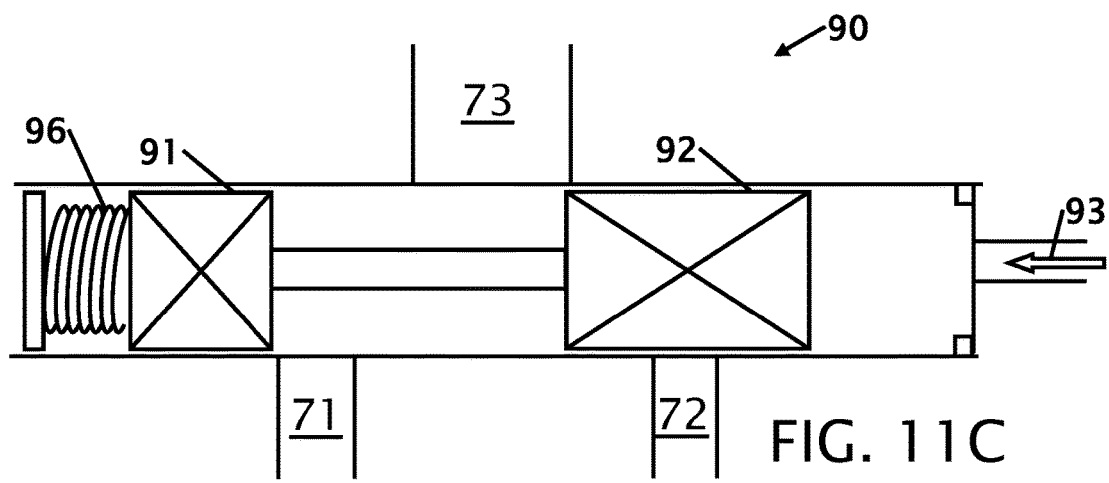

FIG. 11A-11C show sectional views of the waste exhaust valve 90 in operation to control two-or-more discs. At a low exhaust flow rate, only one-disc is turning T1 and exhaust gas bypasses the second disc T2. The bypass of the exhaust gas is from port 72 to port 73 as shown in FIG. 11A. As soon as exhaust pressure builds it will push 93 the spool valve to close port 72 and there will be no bypass of any exhaust gas to the two-discs in operation as seen in FIG. 11B. When the exhaust pressure builds very high, for the protection of the combustion engine, the waste spool valve will open the port 71 to port 73 further and the exhaust gas will bypass the two-discs for protection as shown in FIG. 11C.

Figure 12:
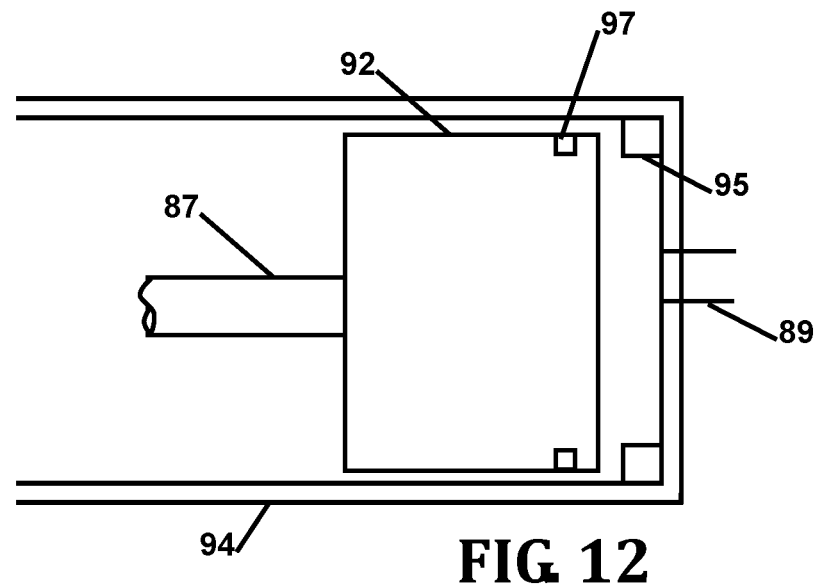
FIG. 12 shows a cartridge body using a thermal insulator.

FIG. 12 shows a valve body 94 using a piston with a thermal insulator 92 and piston compressor ring 97 to seal the piston off from air from port 89. During low pressure of air, the piston will land on ring 95.

Figure 13:
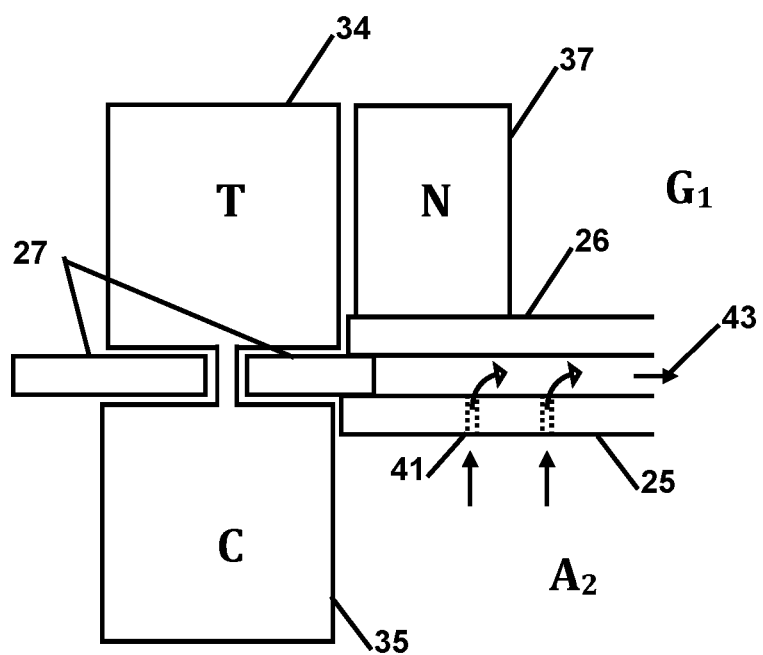
FIG. 13 shows the air bleeding system.

FIG. 13 shows the air bleeding 43 from compressor wall 25 through a bleed vent hole 41 into a space between the compressor chamber wall 25 and the turbine chamber wall 26.

Figure 14:
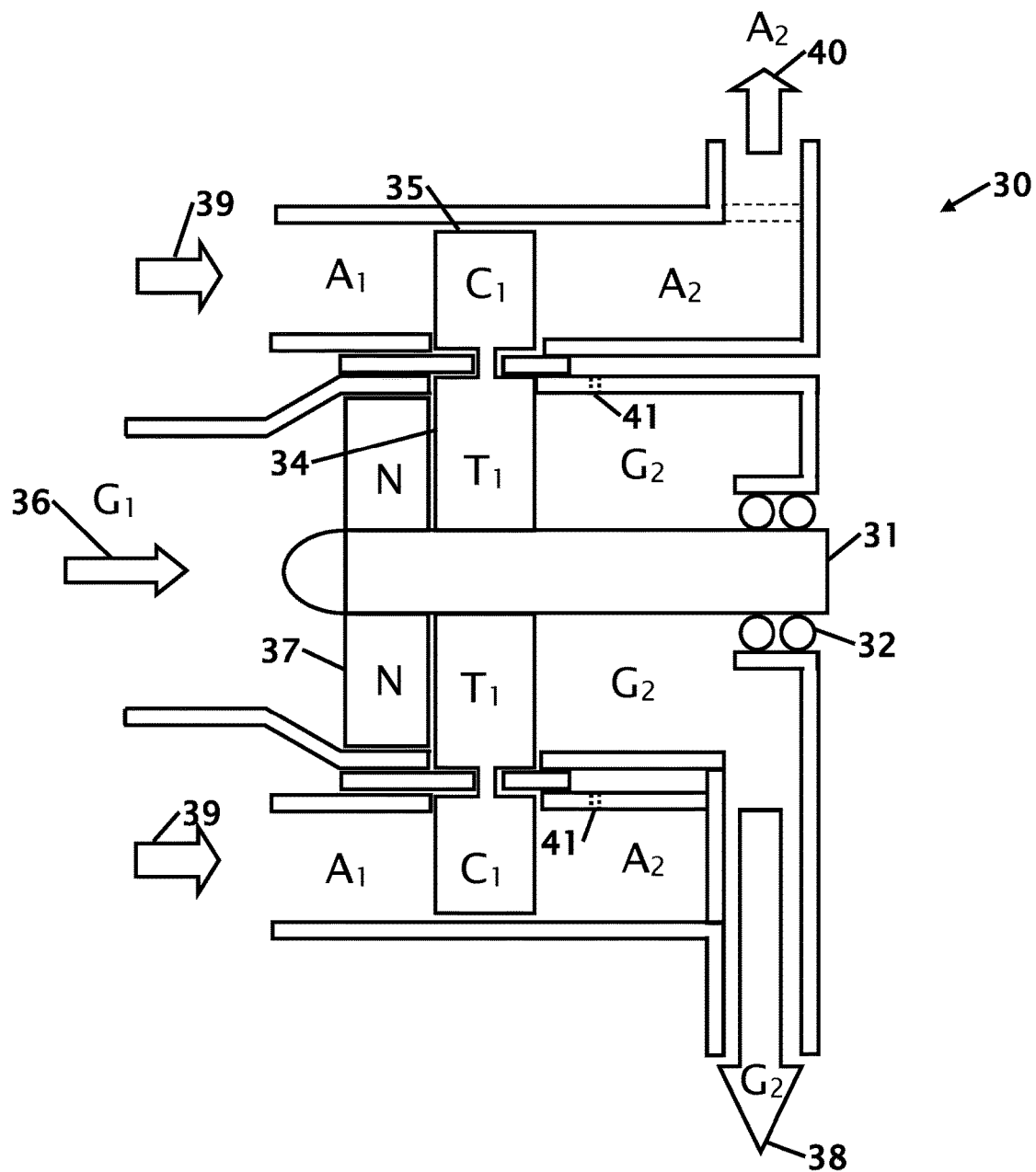
FIG. 14 shows a sectional view of the disc turbocharger with on disc engine.

FIG. 14 shows a sectional view of the disc turbocharger with on disc engine. This is smaller in FIG. 2, except the compress section 35 is outside the turbine section 34.

Thus, specific embodiments of a concentric planar turbo charger have been disclosed. It should be apparent, however, to those skilled in the art that many more modifications besides those described are possible without departing from the inventive concepts herein. The inventive subject matter, therefore, is not to be restricted except in the spirit of the appended claims.

Sequence Listing

Not Applicable.

The invention claimed is:

1. A disc turbocharger defining an axial direction comprising:
    a rotational axis with at least two discs on a shaft;
    wherein each disc of the at least two discs comprises a core bearing, a compressor blade section arranged radially outward of the core bearing and a turbine blade section arranged radially outward of the compressor blade section, wherein the turbine blade section is joined to the compressor blade section;
    a compressor chamber having the at least two compressor blade sections and a turbine chamber having the at least two turbine blade sections;
    a nozzle located in front of a first turbine blade section of a first disc of the at least two discs in said turbine chamber;
    a first compressor blade section of the first disc placed in axial flow to an inlet, and
    an inlet exhaust gas chamber located before said first turbine blade section in said turbine chamber and an outlet exhaust chamber located after a last turbine blade section of the at least two turbine blade sections in said turbine chamber;
    said turbine chamber further includes a first outlet port upstream of the first turbine blade section, and a second outlet port downstream of the first turbine blade section and upstream of a second turbine blade of a second disc of the at least two discs, wherein both the first outlet port and the second outlet port connect to an exhaust gas waste spool valve, and wherein an inlet air chamber is located before said first compressor blade section and an outlet air compressed chamber is located after a last compressor blade section of said at least two compressor blade sections, and
    wherein said exhaust gas waste spool valve controls said disc turbocharger to turbocharge an internal combustion engine.

2. The disc turbocharger according to claim 1, wherein said shaft has a first channel that feeds oil through said core bearing, and said shaft has a second channel that returns the oil from said core bearing to an oil pump of said internal combustion engine.

3. The disc turbocharger according to claim 1, wherein said disc turbocharger has no stator between each of said at least two discs.

4. The disc turbocharger according to claim 1, wherein said core bearing is an oil bearing.

5. The disc turbocharger according to claim 1, that further includes a double wall between said compressor chamber and said turbine chamber, and said double wall includes an air bleed from said compressor chamber into a space between said double wall between said compressor chamber and said turbine chamber.

6. The disc turbocharger according to claim 1, wherein each disc of said at least two discs runs freely and individually from the other discs of the at least two discs and each disc runs in alternate directions of rotation of each adjacent disc and each disc acts as a stator to each adjacent disc and does not have a separate stator between stages of each of the at least two compression blade sections or between each of said at least two turbine blade sections.

7. The disc turbocharger according to claim 1, wherein said exhaust gas waste spool valve includes a two-piston valve, a stem, at least two inlet ports and a single outlet port from said waste spool valve for exhaust gas, a compressed air inlet port, and a spring to balance pressure to control said waste spool valve, and said two-piston valve includes a thermal insulator and compression rings.

8. A disc turbocharger defining an axial direction comprising:
    a rotational axis with at least two discs on a shaft;
    wherein each disc of the at least two discs comprises a compressor blade section radially outward of said shaft and a turbine blade section arranged radially outward of the compressor blade section, wherein the turbine blade section is joined to the compressor blade section;
    a compressor chamber having the at least two compressor blade sections and a turbine chamber having the at least two turbine blade sections;
    a nozzle located in front of a first turbine blade section of a first disc of the at least two discs in said turbine chamber;
    a first compressor blade section of the first disc placed in axial flow to an inlet,
    an inlet exhaust gas chamber located before said first turbine blade section in said turbine chamber and an outlet exhaust chamber located after a last turbine blade section of the at least two turbine blade sections in said turbine chamber;

said turbine chamber further includes a first outlet port upstream of the first turbine blade section, and a second outlet port downstream of the first turbine blade section and upstream of a second turbine blade of a second disc of the at least two discs, wherein both the first outlet port and the second outlet port connect to an exhaust gas waste spool valve, and wherein an inlet air chamber is located before said first compressor blade section and an outlet air compressed chamber is located after a last compressor blade section of said at least two compressor blade sections, and wherein said exhaust gas waste spool valve controls said disc turbocharger to turbocharge an internal combustion engine.

9. The disc turbocharger according to claim 8, wherein said shaft of said at least two discs is coupled to an engine shaft of the internal combustion engine through a transmission and said disc turbocharger acts as a supercharger and said first turbine blade section in said disc turbocharger produces additional torque from exhaust gas of said-internal combustion engine to act as a turbine engine.

10. The disc turbocharger according to claim 9, wherein said transmission includes planetary gears.

11. The disc turbocharger according to claim 9, wherein said transmission is a continuously variable transmission.

12. The disc turbocharger according to claim 9, wherein said transmission is a gear box.

* * * * *